(12) United States Patent
Orii

(10) Patent No.: US 8,905,308 B2
(45) Date of Patent: Dec. 9, 2014

(54) CARD MEDIUM PROCESSING DEVICE AND CONTROL METHOD THEREOF

(75) Inventor: Tsutomu Orii, Nagano (JP)

(73) Assignee: Nidec Sankyo Corporation (JP)

( * ) Notice: Subject to any disclaimer, the term of this patent is extended or adjusted under 35 U.S.C. 154(b) by 377 days.

(21) Appl. No.: 13/511,215

(22) PCT Filed: Nov. 22, 2010

(86) PCT No.: PCT/JP2010/070758
§ 371 (c)(1),
(2), (4) Date: May 22, 2012

(87) PCT Pub. No.: WO2011/065315
PCT Pub. Date: Jun. 3, 2011

(65) Prior Publication Data
US 2012/0234916 A1  Sep. 20, 2012

Related U.S. Application Data

(66) Substitute for application No. PCT/JP2010/070758, filed on Nov. 22, 2010.

(30) Foreign Application Priority Data

Nov. 25, 2009 (JP) ................................. 2009-267789

(51) Int. Cl.
*G06K 5/00* (2006.01)
*G06K 13/06* (2006.01)
*G06K 13/08* (2006.01)
(52) U.S. Cl.
CPC ............... *G06K 13/08* (2013.01); *G06K 13/06* (2013.01)
USPC ........... 235/437; 235/475; 235/449; 235/453; 235/379; 235/380; 235/439

(58) Field of Classification Search
USPC .......... 235/437, 475, 449, 453, 379, 380, 439
See application file for complete search history.

(56) References Cited

U.S. PATENT DOCUMENTS 5,648,651 A * 7/1997 Inoue ............................. 235/475
6,569,072 B1 * 5/2003 Rupp et al. ...................... 493/90
(Continued)

FOREIGN PATENT DOCUMENTS

| JP | 62-102492 A | 5/1987 |
| JP | 5-89577 A | 4/1993 |
| JP | 2003-271909 A | 9/2003 |

OTHER PUBLICATIONS

International Search Report for International Application No. PCT/JP2010/070758, mailed Dec. 21, 2010, with English translation.

*Primary Examiner* — Allyson Trail
(74) *Attorney, Agent, or Firm* — Cantor Colburn LLP

(57) ABSTRACT

A card medium processing device is controlled by means of the control method including: a first judgment step for judging whether or not a card medium having been inserted is detected by a first detection means for detecting the card medium having been inserted; a second judgment step for judging whether or not the card medium having been inserted is detected by a second detection means for detecting the card medium having been inserted, the second detection means being placed at a position behind the first detection means further away toward a rear side in an inserting direction for the card medium; and a processing step for carrying out a predetermined process, supposing that the first detection means has an error, under a situation where the first judgment step does not detect the card medium having been inserted while the second judgment step detects the card medium having been inserted.

10 Claims, 5 Drawing Sheets

(56) References Cited

U.S. PATENT DOCUMENTS

| | | | |
|---|---|---|---|
| 6,910,629 B2* | 6/2005 | Nishigata et al. | 235/441 |
| 7,118,038 B2* | 10/2006 | Miyazawa et al. | 235/453 |
| 2004/0094628 A1* | 5/2004 | Yoshii | 235/475 |
| 2004/0184507 A1* | 9/2004 | Tsukamoto et al. | 374/57 |
| 2004/0262390 A1* | 12/2004 | Orii | 235/449 |
| 2009/0076840 A1* | 3/2009 | Boyden et al. | 705/2 |
| 2014/0183372 A1* | 7/2014 | Frank et al. | 250/374 |

\* cited by examiner

CARD MEDIUM PROCESSING DEVICE AND CONTROL METHOD THEREOF

CROSS REFERENCE TO RELATED APPLICATIONS

This is a U.S. national stage of International Application No. PCT/JP2010/070758, filed on Nov. 22, 2010. Priority under 35 U.S.C. §119(a) and 35 U.S.C. §365(b) is claimed from Japanese Application No. 2009-267789, filed Nov. 25, 2009, the disclosure of which are also incorporated herein by reference.

FIELD OF THE INVENTION

The present invention relates to a card medium processing device equipped with a plurality of detection means for detecting a card medium having been inserted, and a control method thereof.

BACKGROUND

Conventionally, known as a card reader for reading magnetic data recorded in the card is a manual card reader with which a user manually handles the card (For example, refer to Patent Document 1). A card reader described in Patent Document 1 is a so-called swipe-type card reader with which reproduction and so on are carried out with respect to magnetic data of a card, while the card being transferred along a groove card path that is so shaped as to be shallower than a width-wise dimension of the card.

In the card reader described in Patent Document 1, one end and the other end of the card path function as a first card door way and a second card door way, respectively. In the card reader, a first sensor and a second sensor, both for detecting a card being inserted, are placed in the proximity of the first door way as well as in the proximity of the second door way, respectively. Furthermore, in the card reader, a first magnetic head and a second magnetic head are placed so as to face each other across the card path. In the card reader, the first magnetic head turns on so as to become ready for reproduction and so on with respect to magnetic data by the first magnetic head when the first sensor detects a card being inserted. In the meantime, the second magnetic head turns on so as to become ready for reproduction and so on with respect to magnetic data by the second magnetic head when the second sensor detects a card being inserted.

Moreover, as a conventional manual card reader, also known is a so-called dip-type card reader with which reproduction and so on are carried out with respect to magnetic data at the time when a card is inserted into, or pulled out from the card reader (For example, refer to Patent Document 2). The card reader described in Patent Document 2 is equipped with two sensors, as those for detection of a card inserted, while one sensor is placed at an inlet port side in a card traveling path, and the other sensor is placed at a rear side of the card traveling path.

Patent Document 1: Japanese Unexamined Patent Application Publication No. SH062-102492
Patent Document 2: Japanese Unexamined Patent Application Publication No. 2003-271909

In the card reader described in Patent Document 1, reproduction and so on with respect to magnetic data by the first magnetic head become enabled when the first sensor detects a card being inserted, and meanwhile reproduction and so on with respect to magnetic data by the second magnetic head become enabled when the second sensor detects a card being inserted. Accordingly; if an error, such as a breakdown and the like, happens to either the first sensor or the second sensor, reproduction and so on with respect to magnetic data by the first magnetic head or the second magnetic head, respectively, cannot be carried out. Therefore, in case such an error happens to either the first sensor or the second sensor, immediate replacement of the first sensor or the second sensor, respectively, is needed. In the meantime, unfortunately the card reader has no function for detecting a fact that such an error has happened to the first sensor or the second sensor.

SUMMARY

Then, at least an embodiment of the present invention provides a card medium processing device that is able to detect an error of a detection means for detecting a card medium having been inserted. Furthermore, at least an embodiment of the present invention provides a control method of the card medium processing device that is able to detect an error of a detection means for detecting a card medium having been inserted.

To bring a solution for the subject described above, a card medium processing device according to at least an embodiment the present invention includes: a plurality of detection means for detecting a card medium having been inserted; and a control means into which an output signal coming from the plurality of detection means is input; wherein the plurality of detection means include a first detection means, and a second detection means placed at a position behind the first detection means further away toward a rear side in an inserting direction for the card medium; and the control means judges that the first detection means has an error, if the first detection means does not detect the card medium having been inserted while the second detection means detects the card medium having been inserted.

In the card medium processing device according to at least an embodiment the present invention, the control means judges that the first detection means has an error, if the first detection means does not detect the card medium having been inserted while the second detection means detects the card medium having been inserted; the second detection means being placed at the position behind the first detection means further away toward the rear side in the inserting direction for the card medium. Therefore, according to at least an embodiment the present invention, it becomes possible to detect the error of the first detection means on the basis of a judgment result of the control means.

In at least an embodiment the present invention, preferably the control means judges that the first detection means has an error, if there has happened a phenomenon 'n'-times; where in the phenomenon, the first detection means does not detect the card medium having been inserted while the second detection means detects the card medium having been inserted (the 'n' is an integer equal to or greater than '2'). According to this configuration, in the case where the first detection means cannot detect the card medium, due to any cause by chance even though the first detection means has no error, the control means judges that the first detection means has no error. Accordingly, an error of the first detection means can be detected properly. Furthermore, according to this configuration, at the time when the first detection means is on the point of breaking down, etc., namely, an error is on the point of happening to the first detection means; sometimes the first detection means can still detect the card medium having been inserted without replacement of the first detection means. Therefore, the replacement time of the first detection means can be postponed.

Moreover, in this case, preferably the control means judges that the first detection means has an error, if there has continuously happened the phenomenon 'n'-times; where in the phenomenon, the first detection means does not detect the card medium having been inserted while the second detection means detects the card medium having been inserted. According to this configuration, it is simply needed to memorize the number of times the phenomenon has continuously happened; where in the phenomenon, the first detection means does not detect the card medium having been inserted while the second detection means detects the card medium having been inserted. Accordingly, a control process for counting the number of times the phenomenon has happened becomes relatively easy; where in the phenomenon, the first detection means does not detect the card medium having been inserted while the second detection means detects the card medium having been inserted.

In at least an embodiment the present invention, preferably the control means sends an error occurrence signal to a higher-level control means for controlling a higher-level device in which the card medium processing device is installed, at the time when judging that the first detection means has an error. According to this configuration, the higher-level device can recognize that the first detection means has an error. Therefore, the higher-level device can carry out a predetermined process, as required.

In at least an embodiment the present invention, for example, the card medium processing device includes a card inserting port for inserting the card medium, and a card passing path that is so shaped as to lead to the card inserting port, and for having the card medium pass through; the first detection means detects the card medium having been inserted through the card inserting port; and the second detection means detects an end part of the card medium at a side toward the inserting direction having reached a rear end side of the card passing path in the inserting direction, and the card medium having stopped at a predetermined position.

In at least an embodiment the present invention, for example, the card medium processing device is a manual card-medium processing device for manually handling the card medium by a user of the card medium processing device.

In at least an embodiment the present invention, preferably the first detection means is a mechanical detection means including a contacting member that the card medium contacts, and a sensor for detecting displacement of the contacting member. According to this configuration, the first detection means can appropriately detect a card medium, even being transparent, which is detected with difficulty by an optical detection means for detecting the card medium, wherein the card medium blocks a space between a light emitting device and a photo acceptance device; as well as even another card medium having its round corner, which is not in accordance with standards for the card medium. In the meantime, in the case of the first detection means equipped with the contacting member, although the contacting member becomes worn owing to contact with the card medium so that the first detection means is likely to have an error, an error of the first detection means can be detected on the basis of a judgment result of the control means, according to at least an embodiment the present invention.

To bring a solution for the subject described above, a control method of a card medium processing device according to at least an embodiment the present invention includes: a first judgment step for judging whether or not a card medium having been inserted is detected by a first detection means for detecting the card medium having been inserted; a second judgment step for judging whether or not the card medium having been inserted is detected by a second detection means for detecting the card medium having been inserted, the second detection means being placed at a position behind the first detection means further away toward a rear side in an inserting direction for the card medium; and a processing step for carrying out a predetermined process, supposing that the first detection means has an error, under a situation where the first judgment step does not detect the card medium having been inserted while the second judgment step detects the card medium having been inserted.

In the control method of a card medium processing device according to at least an embodiment the present invention, when the first judgment step does not detect the card medium having been inserted while the second judgment step detects the card medium having been inserted, it is supposed that the first detection means has an error, and then a predetermined process is carried out in the processing step. Therefore, in at least an embodiment the present invention, the error of the first detection means can be detected according to the process of the processing step.

In at least an embodiment the present invention, preferably the control method of a card medium processing device includes a third judgment step for judging whether or not there has continuously happened a phenomenon 'n'-times; where in the phenomenon, the first judgment step does not detect the card medium having been inserted while the second judgment step detects the card medium having been inserted (the 'n' is an integer equal to or greater than '2'); and the processing step carries out a predetermined process if the third judgment step judges that there has continuously happened the phenomenon 'n'-times; where in the phenomenon, the first judgment step does not detect the card medium having been inserted while the second judgment step detects the card medium having been inserted.

According to this configuration, in the case where the first detection means cannot detect the card medium, due to any cause by chance even though the first detection means has no error, the processing step does not carry out the predetermined process, and no error of the first detection means is detected. Accordingly, an error of the first detection means can be detected properly. Furthermore, according to this configuration, at the time when the first detection means is on the point of breaking down, etc., namely, an error is on the point of happening to the first detection means; sometimes the first detection means can still detect the card medium having been inserted without replacement of the first detection means. Therefore, the replacement time of the first detection means can be postponed. Moreover, according to this configuration, it is simply needed to memorize the number of times the phenomenon has continuously happened; where in the phenomenon, the first detection means does not detect the card medium having been inserted while the second detection means detects the card medium having been inserted. Accordingly, a control process for counting the number of times the phenomenon has happened becomes relatively easy; where in the phenomenon, the first detection means does not detect the card medium having been inserted while the second detection means detects the card medium having been inserted.

As described above, the card medium processing device of at least an embodiment the present invention is able to detect an error of the first detection means for detecting a card medium having been inserted. Moreover, according to the control method of the card medium processing device of at least an embodiment the present invention, it becomes possible to detect an error of the first detection means for detecting a card medium having been inserted.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE PREFERRED EMBODIMENTS

An embodiment of the present invention is explained below with reference to the accompanying drawings.
(Structure of Card Medium Processing Device)

Figure 1:
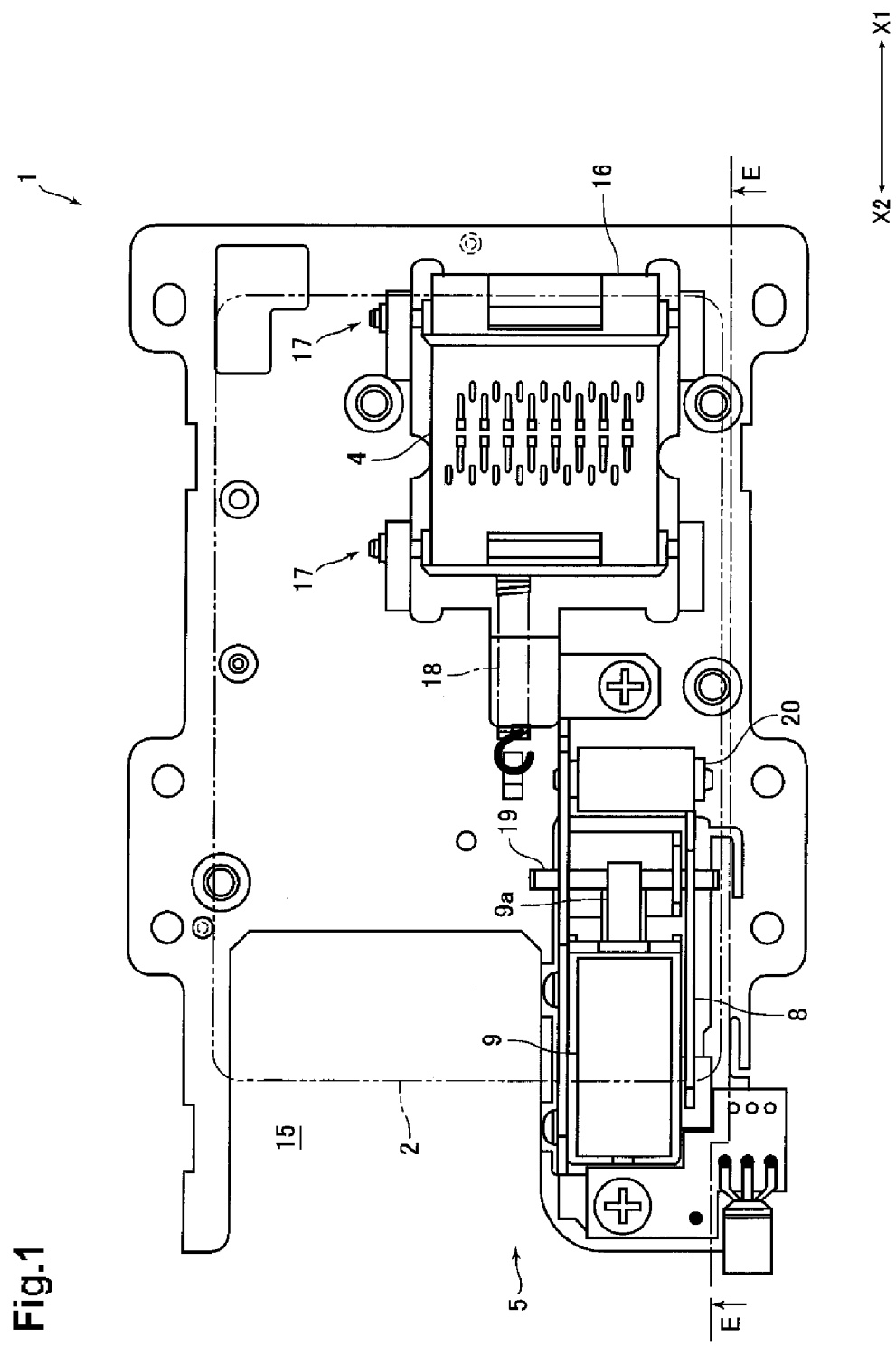
FIG. 1 is a plan view for an explanation of a general structure of a card medium processing device according to an embodiment of the present invention.
Figure 2:
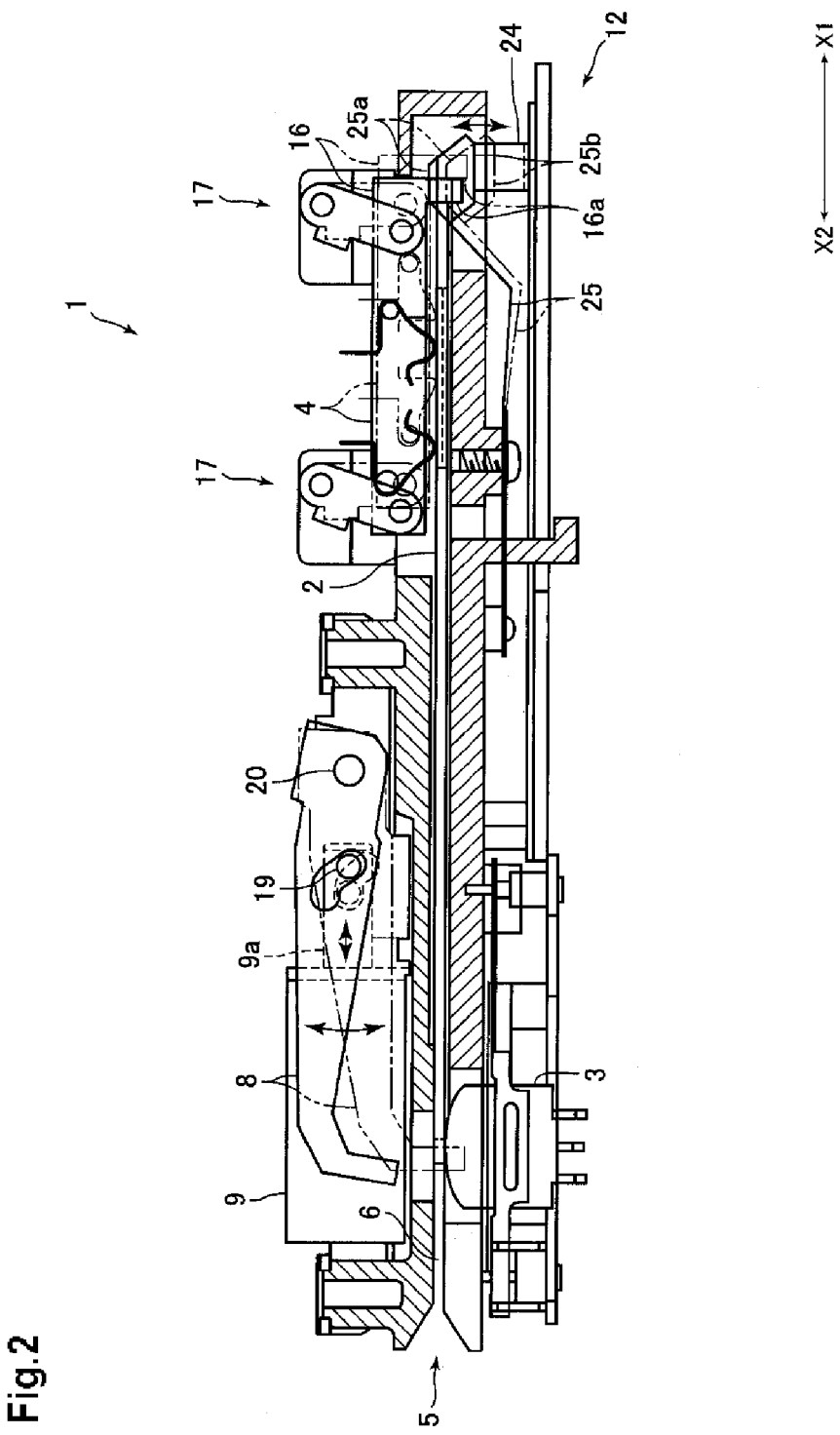
FIG. 2 is a side view for an explanation of a general structure of the card medium processing device, the view being taken from a line E-E shown in FIG. 1.
Figure 3:
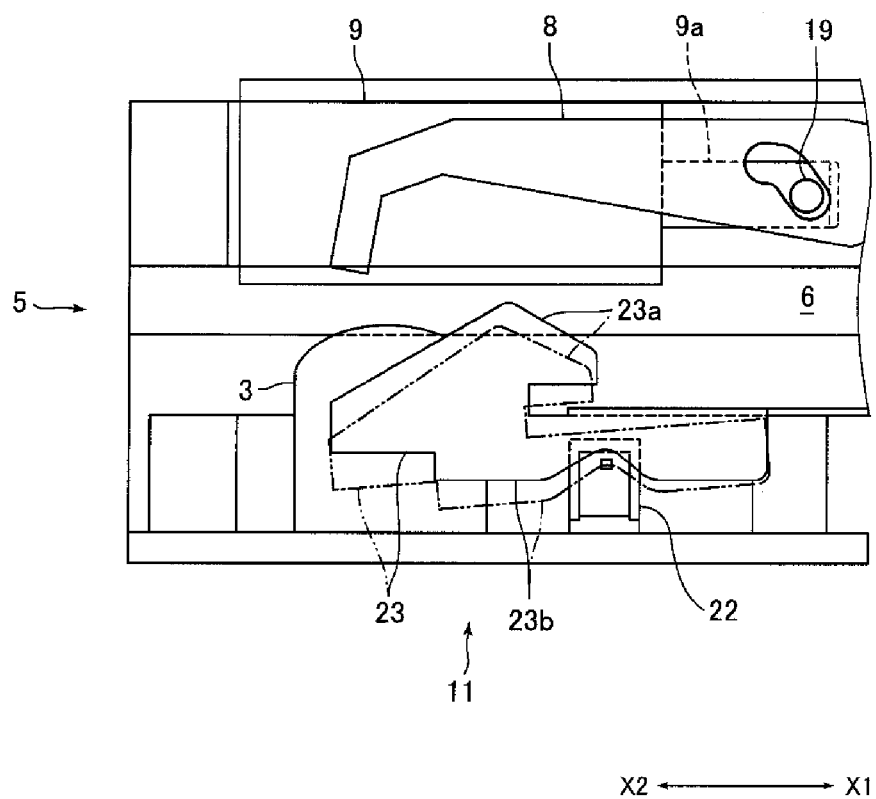
FIG. 3 is a side view for an explanation of a general structure of a front detection mechanism of the card medium processing device shown in FIG. 1.
Figure 4:
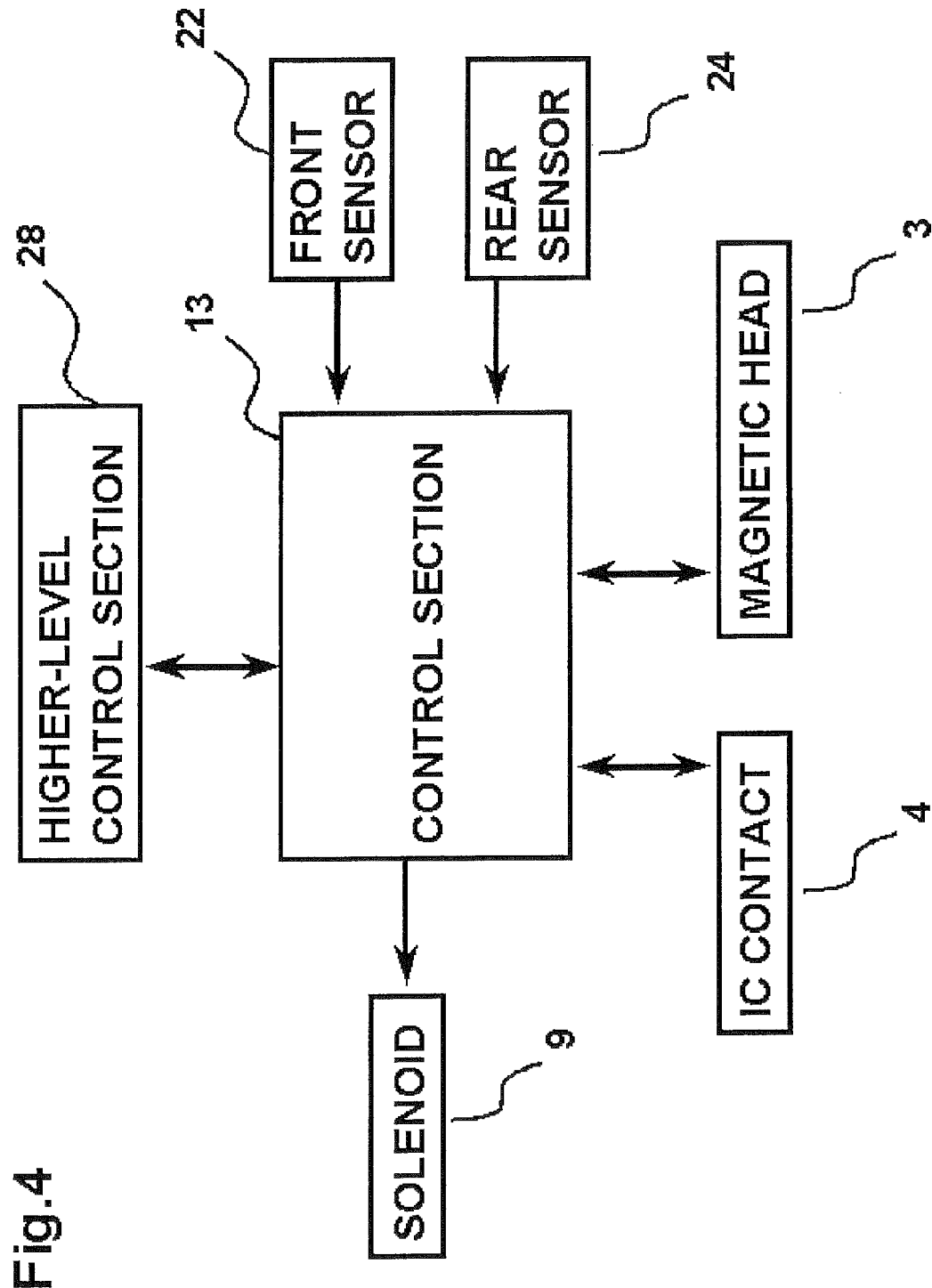
FIG. 4 is a block diagram showing a configuration with respect to a control section of the card medium processing device shown in FIG. 1.

FIG. 1 is a plan view for an explanation of a general structure of a card medium processing device 1 according to an embodiment of the present invention. FIG. 2 is a side view for an explanation of a general structure of the card medium processing device 1, the side view being taken from a line E-E shown in FIG. 1. FIG. 3 is a side view for an explanation of a general structure of a front detection mechanism 11 of the card medium processing device 1 shown in FIG. 1. FIG. 4 is a block diagram showing a configuration with respect to a control section 13 of the card medium processing device 1 shown in FIG. 1.

The card medium processing device 1 according to the embodiment is a card reader with which a user manually handles a card 2 as a card medium for reproducing data recorded in the card 2 and recording data into the card 2. Specifically, the card medium processing device 1 is a diptype card reader with which reproducing data recorded in the card 2 and recording data into the card 2 are carried out at the time when the user manually inserts the card 2 into the device, or pulls out the card 2 from the device. In the explanation below, the card medium processing device 1 according to the present embodiment is called a "card reader 1." Incidentally, the card reader 1 according to the present embodiment is used, being installed in a predetermined higher-level device.

As shown in FIG. 1 through FIG. 3, the card reader 1 is equipped with a magnetic head 3 and an IC contact 4 for reproducing data recorded in the card 2 and recording data into the card 2. In the card reader 1, a card passing path 6 is linearly shaped so as to have the card 2 pass through, as shown in FIG. 2, wherein the card 2 being inserted through a card inserting port 5. Furthermore, the card reader 1 is equipped with a lever 8, which protects the card 2 inserted internally from being pulled out, and a solenoid 9 for driving the lever 8. Still further, the card reader 1 is equipped with a front detection mechanism 11 and a rear detection mechanism 12, which detect the card 2 having been inserted internally, as well as a control section 13 for controlling the card reader 1, as shown in FIG. 2 through FIG. 4.

In the present embodiment, the card 2 is inserted toward a direction X1, and then the card 2 is pulled out toward a direction X2, as shown in FIG. 1 and so on. In other words, the direction X1 is an inserting direction for the card 2. Then, a side of the direction X1 is a rear side in the inserting direction for the card 2, and on the other hand, a side of the direction X2 is a front side in the inserting direction for the card 2. Accordingly, in the explanation below, the side of the direction X1 is called a "rear side", and the side of the direction X2 is called a "front side."

For example, the card 2 is a rectangular card made of vinyl chloride, having a thickness of around 0.7 to 0.8 mm. Formed on a surface of the card 2 is a magnetic stripe (not illustrated) in which magnetic data is recorded. Furthermore, an IC chip (not illustrated) is fixed on the surface of the card 2. Incidentally, in the card 2, the magnetic stripe may be formed with no IC chip fixed there; or alternatively, the IC chip may be fixed with no magnetic stripe formed there. Moreover, an antenna for communication may be embedded in the card 2; or furthermore, a character print part for printing a character by means of a thermal print method may be formed on the surface of the card 2. Still further, the card 2 may be a PET (polyethylene tere-phthalate) card having a thickness of around 0.18 to 0.36 mm, a paper card having a predetermined thickness, and the like.

As shown in FIG. 1, a part of a front end section of the card reader 1 has a cutout part 15 that is cut out in order to allow a user to insert the card 2 as well as pull out the card 2, so that a part of the card 2 inserted toward a rear end side of the card reader 1 becomes exposed at the cutout part 15. In the meantime, the card inserting port 5 is located at a front end of the card passing path 6, as shown in FIG. 2. Namely, the card passing path 6 is so shaped as to lead to the card inserting port 5. The magnetic head 3 is positioned at a front end side of the card reader 1. Incidentally, the magnetic head 3 is placed at a lower side of the card passing path 6, as shown in FIG. 2.

The IC contact 4 is positioned at the rear end side of the card reader 1. Incidentally, the IC contact 4 is placed at an upper side of the card passing path 6, as shown in FIG. 2. The IC contact 4 is fixed to a contact holding member 16. As shown in FIG. 2, a card catching part 16a is formed for catching a top end (rear end) of the card 2 at the rear end side of the contact holding member 16. Then, being connected to a link mechanism 17, the contact holding member 16 moves in a vertical direction in FIG. 2, while sliding in a horizontal direction in FIG. 2. Specifically, the contact holding member 16 lowers when moving toward the rear side as illustrated with a chain double-dashed line in FIG. 2, and in the meantime the contact holding member 16 lifts when moving toward the front side as illustrated with a solid line in FIG. 2. Then, the contact holding member 16 is biased toward the front side by means of a tension coil spring 18.

According to the present embodiment, if once the top end of the card 2 inserted to the rear side of the card reader 1 is caught by the card catching part 16a of the contact holding member 16, the contact holding member 16 lowers while sliding toward the rear side in such a way that the IC contact 4 contacts with the IC chip of the card 2. Meanwhile, when the card 2 inserted to the rear side is pulled toward the front side, the contact holding member 16 lifts while sliding toward the front side by means of a biasing force of the tension coil spring 18 in such a way that the IC contact 4 separates from the surface of the card 2.

The lever 8 is so structured as to be rotatable to a close position for closing the card passing path 6, as illustrated with a chain double-dashed line in FIG. 2; and an open position for opening the card passing path 6, as illustrated with a solid line in FIG. 2, having a function to protect the inserted card 2 at the close position from being pulled out. Specifically, the lever 8 fulfills a function to protect the card 2 from being pulled out under a situation where the IC chip of the card 2 and the IC contact 4 are contacting each other for exchanging data.

Being connected to the solenoid 9 by way of a connection pin 19 that is fixed to a plunger 9*a* of the solenoid 9, the lever 8 turns with respect to a turning center axis 20 positioned at a rear side end of the lever 8. Specifically, when the plunger 9*a* protrudes, the lever 8 turns with respect to the turning center axis 20 in a clockwise direction in FIG. 2 so as to open the card passing path 6; and in the meantime, when the plunger 9*a* withdraws, the lever 8 turns with respect to the turning center axis 20 in a counterclockwise direction in FIG. 2 so as to close the card passing path 6.

The front detection mechanism 11 is positioned at the front end side of the card reader 1. The front detection mechanism 11 fulfills a function to detect the card 2 having been inserted through the card inserting port 5. The front detection mechanism 11 is equipped with a front sensor 22 and a sensor plate 23, as shown in FIG. 3.

The front sensor 22 is an optical sensor equipped with a light emitting device and a photo acceptance device, wherein both the devices being not shown. The front sensor 22 detects displacement of the sensor plate 23. The sensor plate 23 is a leaf spring, for example, shaped by using a thin metal plate. The sensor plate 23 includes a card-contacting part 23*a* that contacts the card 2, and a light-blocking part 23*b* that blocks a space between the light emitting device and the photo acceptance device of the front sensor 22. A rear end side of the sensor plate 23 is fixed to a main frame of the card reader 1, which makes up the card passing path 6.

When the card 2 is not inserted through the card inserting port 5, a part of the card-contacting part 23*a* protrudes into the card passing path 6, as illustrated with a solid line in FIG. 3. Under the situation, the light-blocking part 23*b* does not block the space between the light emitting device and the photo acceptance device of the front sensor 22. In the meantime, when the card 2 is inserted through the card inserting port 5 so that the surface of the card 2 contacts the card-contacting part 23*a*, the sensor plate 23 bends so as to move the light-blocking part 23*b* downward in FIG. 3 to block the space between the light emitting device and the photo acceptance device of the front sensor 22, as illustrated with a chain double-dashed line in FIG. 3. Thus, by means of blocking the space between the light emitting device and the photo acceptance device of the front sensor 22 with the light-blocking part 23*b*, detected is the card 2 having been inserted through the card inserting port 5.

The rear detection mechanism 12 is positioned at the rear end side of the card reader 1. The rear detection mechanism 12 fulfills a function to detect the card 2 having been inserted to the rear end side of the card reader 1. In other words, the rear detection mechanism 12 serves a function to detect the top end of the card 2 having reached a rear end side of the card passing path 6, and the card 2 having stopped. Specifically, the rear detection mechanism 12 serves a function to detect the top end of the card 2 having been caught by the card catching part 16*a* of the contact holding member 16, and the card 2 having stopped under a situation where the IC contact 4 is contacting the IC chip of the card 2.

As shown in FIG. 2, the rear detection mechanism 12 is equipped with a rear sensor 24 and a sensor plate 25. In the same way as the front sensor 22, the rear sensor 24 is an optical sensor equipped with a light emitting device and a photo acceptance device, wherein both the devices being not shown. The rear sensor 24 detects displacement of the sensor plate 25. In the same way as the sensor plate 23, the sensor plate 25 is a leaf spring, for example, shaped by using a thin metal plate. The sensor plate 25 includes a card-contacting part 25*a* that contacts the card 2, and a light-blocking part 25*b* that blocks the space between the light emitting device and the photo acceptance device of the rear sensor 24. A front end side of the sensor plate 25 is fixed to a main frame of the card reader 1, which makes up the card passing path 6.

When the top end of the card 2 has not reached the rear end side of the card passing path 6, a part of the card-contacting part 25*a* protrudes into the card passing path 6, as illustrated with a solid line in FIG. 2. Under the situation, the light-blocking part 25*b* does not block the space between the light emitting device and the photo acceptance device of the rear sensor 24. In the meantime, when the top end of the card 2 has reached the rear end side of the card passing path 6 so that the surface of the card 2 contacts the card-contacting part 25*a*, the sensor plate 25 bends so as to move the light-blocking part 25*b* downward in FIG. 2 to block the space between the light emitting device and the photo acceptance device of the rear sensor 24, as illustrated with a chain double-dashed line in FIG. 2. Thus, by means of blocking the space between the light emitting device and the photo acceptance device of the rear sensor 24 with the light-blocking part 25*b*, detected is the top end of the card 2 having reached the rear end side of the card passing path 6, and the card 2 having stopped.

The sensor plate 23 according to the present embodiment is a contacting member that the card 2 contacts, and the front sensor 22 is a sensor for detecting displacement of the sensor plate 23 as the contacting member. In the meantime, the front detection mechanism 11 according to the present embodiment is a mechanical detection means equipped with the sensor plate 23 as the contacting member, and the front sensor 22 as a sensor for detecting displacement of the contacting member. Meanwhile, in the similar way as the front detection mechanism 11, the rear detection mechanism 12 according to the present embodiment is a mechanical detection means equipped with the sensor plate 25 that the card 2 contacts. Then, the front detection mechanism 11 according to the present embodiment is a first detection means, and the rear detection mechanism 12 is a second detection means placed at a position behind the front detection mechanism 11, functioning as the first detection means, further away toward the rear side.

As shown in FIG. 4, the magnetic head 3, the IC contact 4, and the solenoid 9 are connected to the control section 13. Furthermore, the front sensor 22 and the rear sensor 24 are connected to the control section 13 in order to enter an output signal coming from the front sensor 22 and the rear sensor 24. Still further, connected to the control section 13 is a higher-level control section 28 for controlling a higher-level device in which the card reader 1 is installed. Incidentally, the control section 13 according to the present embodiment is a control means for controlling the card reader 1, and in the meantime the higher-level control section 28 is a higher-level control means for controlling the higher-level device.

(Control Method of Card Medium Processing Device)

Figure 5:
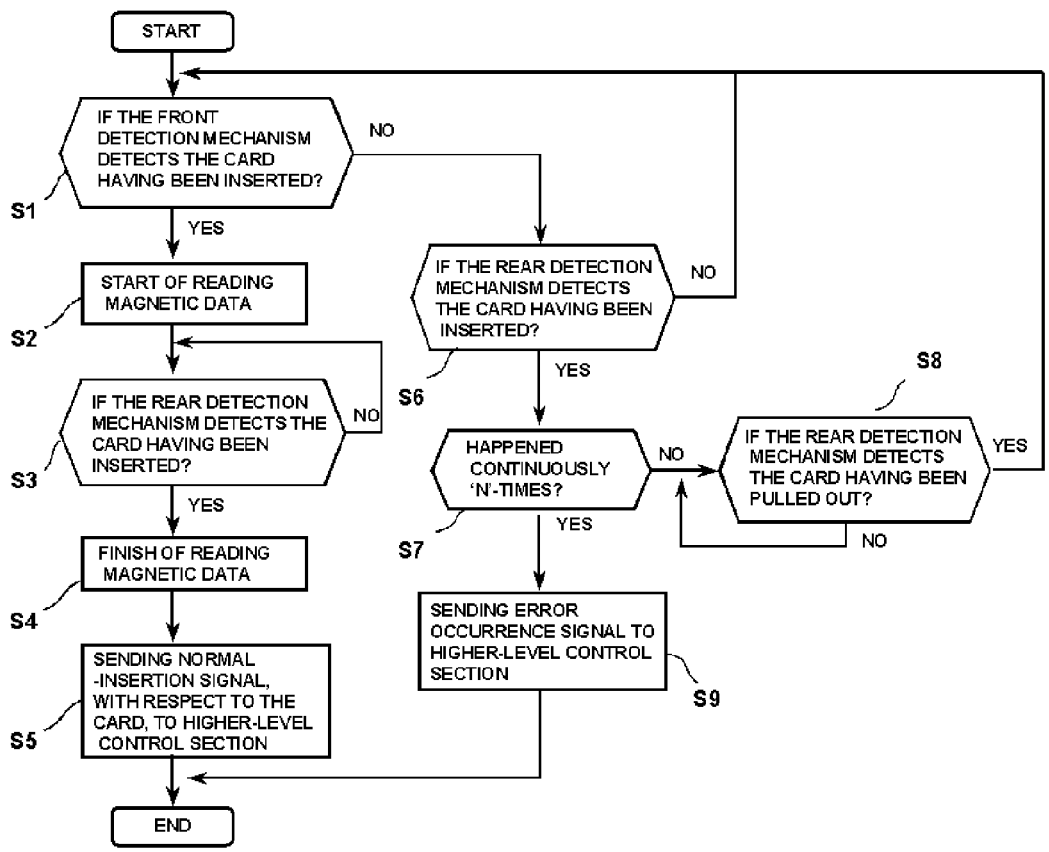
FIG. 5 is a flowchart showing an example of a control workflow in the card medium processing device shown in FIG. 1, at the time when a card medium being inserted.

FIG. 5 is a flowchart showing an example of a control workflow in the card medium processing device 1 shown in FIG. 1, at the time when the card medium 2 being inserted.

Explained below is an example of a control method of the card reader 1 structured as described above, at the time when the card 2 being inserted. As represented by the workflow shown in FIG. 5, at first according to an output signal from the front sensor 22, the control section 13 makes a judgment on whether or not the front detection mechanism 11 has detected the card 2 having been inserted through the card inserting port 5 (Step S1).

If the card 2 having been inserted through the card inserting port 5 is detected at Step S1, the control section 13 starts reading magnetic data recorded in the card 2 by using the magnetic head 3 (Step S2). Then, according to an output signal from the rear sensor 24, the control section 13 makes a judgment on whether or not the rear detection mechanism 12 has detected the card 2 having been inserted to the rear end side of the card reader 1 (Step S3).

If the card 2 having been inserted to the rear end side of the card reader 1 is detected at Step S3, the control section 13 finishes reading the magnetic data of the card 2 by using the magnetic head 3 (Step S4), and sends a normal-insertion signal with respect to the card 2, which notifies that the card 2 has normally been inserted into the card reader 1, to the higher-level control section 28 (Step S5). If the normal-insertion signal is input into the higher-level control section 28, the higher-level control section 28 sends, for example, a command signal for data reproducing/recording by the IC contact 4, and the like, to the control section 13. In another case, if the normal-insertion signal is input into the higher-level control section 28, the higher-level control section 28 retrieves, for example, the magnetic data read out by the magnetic head 3, and controls the higher-level device to display an indication at a predetermined display position and so on, in order to prompt a user to pull out the card 2 from the card reader 1.

In the meantime, if the card 2 having been inserted through the card inserting port 5 is not detected at Step S1, according to an output signal from the rear sensor 24, the control section 13 makes a judgment on whether or not the rear detection mechanism 12 has detected the card 2 having been inserted to the rear end side of the card reader 1 (Step S6). If the card 2 having been inserted to the rear end side of the card reader 1 is not detected at Step S6, operation returns to Step S1.

On this occasion, if the card 2 having been inserted to the rear end side of the card reader 1 is detected at Step S6, there is a chance that the front detection mechanism 11 has an error. For example, in this case, it can be supposed that the displacement of the light-blocking part 23b becomes less due to wear of the card-contacting part 23a notwithstanding the card 2 having been inserted through the card inserting port 5, in such a way that the light-blocking part 23b does not anymore block the space between the light emitting device and the photo acceptance device of the front sensor 22. If the front detection mechanism 11 has an error in such a way, the card reader 1 does not work properly unless maintenance work, such as replacing the sensor plate 23, and the like is not carried out.

In the meantime, for example, if the wear of the card-contacting part 23a is not so much even though the card 2 having been inserted to the rear end side of the card reader 1 is detected at Step S6, there is a chance that re-inserting the card 2 makes the light-blocking part 23b block the space between the light emitting device and the photo acceptance device of the front sensor 22. As another possibility, meanwhile the card 2 having been inserted to the rear end side of the card reader 1 is detected at Step S6; there is a chance that the front detection mechanism 11 cannot detect the card 2, actually having been inserted, due to any cause by chance even though the front detection mechanism 11 has no error.

Therefore, according to the present embodiment, if the card 2 having been inserted to the rear end side of the card reader 1 is detected at Step S6, the control section 13 makes a judgment on whether or not there has continuously happened a phenomenon 'n'-times (Step S7); where in the phenomenon, the card 2 having been inserted through the card inserting port 5 is not detected at Step S1, and meanwhile the card 2 having been inserted to the rear end side of the card reader 1 is detected at Step S6. If the phenomenon does not continuously happen 'n'-times at Step S7, the control section 13 waits for the card 2 being pulled out, in order to stand by, waiting for the card 2 being inserted again into the card reader 1. Then, if once the card 2 is pulled out, operation returns to Step S1. In other words, if the phenomenon does not continuously happen 'n'-times at Step S7, the control section 13 judges on the basis of the output signal from the rear sensor 24, by means of the rear detection mechanism 12, whether the card 2 having been pulled out is detected (Step S8). Then, if once the card 2 is pulled out, operation returns to Step S1. Incidentally, on this occasion, the 'n' is an integer equal to or greater than '2.'

On the other hand, if the phenomenon described above does continuously happen 'n'-times at Step S7, the control section 13 judges that the front detection mechanism 11 has an error, and then sends an error occurrence signal to the higher-level control section 28 for notifying that the front detection mechanism 11 has the error (Step S9). If the error occurrence signal is input into the higher-level control section 28, the higher-level control section 28 controls, for example, the higher-level device to display an indication at a predetermined display position and so on, in order to notify the user that the card reader 1 cannot be used. As another possibility, the higher-level control section 28 controls, for example, the higher-level device to display an indication at a predetermined display position and so on, in order to notify the user that maintenance work is required for the front detection mechanism 11.

Incidentally, Step S1 in the present embodiment is a first judgment step for judging whether or not the card 2 having been inserted is detected by the front detection mechanism 11 as the first detection means. Step S6 is a second judgment step for judging whether or not the card 2 having been inserted is detected by the rear detection mechanism 12 as the second detection means. Step S9 is a processing step for carrying out a predetermined process, supposing that the front detection mechanism 11 has an error, under a situation where the card 2 having been inserted is not detected at Step S1 but detected at Step S6. Then, Step S7 in the present embodiment is a third judgment step for judging whether or not there has continuously happened the phenomenon 'n'-times; where in the phenomenon, the card 2 having been inserted is not detected at Step S1 but detected at Step S6.

PRIMARY ADVANTAGEOUS EFFECT OF THE PRESENT EMBODIMENT

As explained above, if there has continuously happened the phenomenon 'n'-times at Step S7 in the present embodiment; where in the phenomenon, the front detection mechanism 11 does not detects the card 2 having been inserted through the card inserting port 5, and meanwhile the rear detection mechanism 12 detects the card 2 having been inserted to the rear end side of the card reader 1; the control section 13 judges that the front detection mechanism 11 has an error, and then sends an error occurrence signal to the higher-level control section 28 at Step S9. Therefore, in the present embodiment, it becomes possible to detect the error of the front detection mechanism 11 according to the error occurrence signal sent to the higher-level control section 28. For example, it becomes possible to detect an error of the front detection mechanism 11 owing to an electrical malfunction, such as a broken cable of the front sensor 22, and the like. Even in another case where no electrical malfunction exists, detected can be an error of the front detection mechanism 11, owing to wear of the card-contacting part 23a, and so on. Moreover, it becomes possible to detect an error of the front detection mechanism 11 owing to damage and/or deterioration of the light-blocking part 23b, as well as an error of the front detection mechanism 11, which may happen due to a foreign material adhering to the front sensor 22, and the like. Furthermore, in the present embodiment, according to the error occurrence signal, the higher-level control section 28 can recognize that the front detection mechanism 11 has an error; and therefore it becomes possible to carry out a predetermined process, such as displaying a predetermined indication in a display unit of the higher-level device and so on, as required.

Moreover, in the present embodiment, if the above-mentioned phenomenon continuously happens 'n'-times at Step S7, the control section 13 judges that the front detection mechanism 11 has an error. Therefore, in the case where the front detection mechanism 11 cannot detect the card 2, actually having been inserted, due to any cause by chance even though the front detection mechanism 11 has no error, the control section 13 judges that the front detection mechanism 11 has no error. Accordingly, in the present embodiment, an error of the front detection mechanism 11 can be detected properly. Furthermore, for example, in the case where the wear of the card-contacting part 23a is not so much that inserting the card 2 into the card reader 1 makes the front detection mechanism 11 detect the card 2 having been inserted, the front detection mechanism 11 can detect the card 2 having been inserted, without replacement of the sensor plate 23. Therefore, the replacement time of the sensor plate 23 can be postponed.

Furthermore, in the present embodiment, if the above-mentioned phenomenon continuously happens 'n'-times at Step S7, the control section 13 judges that the front detection mechanism 11 has an error. Therefore, the control section 13 simply needs to memorize the number of times the above-mentioned phenomenon has continuously happened. Accordingly, a control process for counting the number of times the above-mentioned phenomenon has happened becomes relatively easy.

In the present embodiment, the front detection mechanism 11 is a mechanical detection means equipped with the sensor plate 23 that the card 2 contacts. Therefore, the front detection mechanism 11 can appropriately detect a card 2, even being transparent, which is detected with difficulty by an optical detection means for detecting the card 2, wherein the card 2 blocks the space between the light emitting device and the photo acceptance device; as well as even another card 2 having its round corner, which is not in accordance with standards for the card 2. In the meantime, although the sensor plate 23 that contacts the card 2 becomes worn owing to contact with the card 2 so that the front detection mechanism 11 is likely to have an error, the present embodiment makes it possible to appropriately detect an error of the front detection mechanism 11 as described above.

Other Embodiments

Described above is an example of a preferred embodiment according to the present invention. However, the present invention is not limited to the above embodiment and various variations and modifications may be made without changing the concept of the present invention.

In the embodiment described above, the card reader 1 includes two detection mechanisms; namely, the front detection mechanism 11 and the rear detection mechanism 12, for detecting the card 2 having been inserted internally. Also, in another way for example, the card reader 1 may include three or more detection mechanisms for detecting the card 2 having been inserted internally.

For example, the card reader 1 may include three detection mechanisms; namely a first detection mechanism, a second detection mechanism, and a third detection mechanism that are placed in this order from the front side to the rear side. In this case, it becomes possible to detect the first detection mechanism and the second detection mechanism having an error. Specifically, if the first detection mechanism does not detect the card 2 having been inserted while the second detection mechanism and/or the third detection mechanism detect the card 2 having been inserted, the control section 13 can judge that the first detection mechanism has an error, and namely the control section 13 can detect the error of the first detection mechanism. Then, if the second detection mechanism does not detect the card 2 having been inserted while the third detection mechanism detects the card 2 having been inserted, the control section 13 can judge that the second detection mechanism has an error, and namely the control section 13 can detect the error of the second detection mechanism.

Also, for example, the card reader 1 may include four detection mechanisms; namely a first detection mechanism, a second detection mechanism, a third detection mechanism, and a fourth detection mechanism that are placed in this order from the front side to the rear side. In this case, in the similar way as the case where the card reader 1 includes three detection mechanisms, it becomes possible to detect the first detection mechanism, the second detection mechanism, and the third detection mechanism that have an error. Incidentally, in the case where the card reader 1 includes three or more detection mechanisms, the control section 13 sends an error occurrence signal, with which a detection mechanism having an error can be identified, to the higher-level control section 28.

In the embodiment described above, the front detection mechanism 11 is placed at the front end side of the card reader 1, and meanwhile the rear detection mechanism 12 is placed at the rear end side of the card reader 1. Also, in another way for example, while the front detection mechanism 11 being not placed, a detection mechanism having a similar structure as the front detection mechanism 11 may be placed at an intermediate position of the card reader 1 in the inserting direction for the card 2. Further alternatively, while the rear detection mechanism 12 being not placed, a detection mechanism having a similar structure as the rear detection mechanism 12 may be placed at an intermediate position of the card reader 1 in the inserting direction for the card 2.

In the embodiment described above, if there has continuously happened the phenomenon 'n'-times; where in the phenomenon, the front detection mechanism 11 does not detect the card 2 having been inserted, and meanwhile the rear detection mechanism 12 detects the card 2 having been inserted; the control section 13 judges that the front detection mechanism 11 has an error. Also, in another way for example, the control section 13 may judge that the front detection mechanism 11 has an error when the phenomenon has happened once. Furthermore, although the control section 13 judges that the front detection mechanism 11 has an error in the embodiment described above if there has continuously happened the phenomenon 'n'-times, the control section 13 may judge that the front detection mechanism 11 has an error when there has happened the phenomenon not continuously but 'n'-times in total.

In the embodiment described above, the front detection mechanism 11 and the rear detection mechanism 12 are mechanical detection means. Also, in another way for example, the front detection mechanism 11 and/or the rear detection mechanism 12 may be optical detection means for detecting the card 2 by way of detecting the card 2 blocking the space between the light emitting device and the photo acceptance device. Furthermore, although the front sensor 22 and the rear sensor 24 are optical sensors in the embodiment described above, the front sensor 22 and/or the rear sensor 24 may be mechanical sensors, such as micro-switches and the like. Incidentally, when the front detection mechanism 11 is an optical detection means, it becomes possible to detect an error that happens at the front detection mechanism 11 due to a foreign material adhering to the optical sensor, and so on.

In the embodiment described above, the front detection mechanism 11 is structured in such a way that; when the surface of the card 2 contacts the card-contacting part 23*a*, the light-blocking part 23*b* moves downward in FIG. 3 to block the space between the light emitting device and the photo acceptance device of the front sensor 22. Also, in another way for example, the front detection mechanism 11 may be structured in such a way that; when an end surface of the card 2 contacts the card-contacting part 23*a*, the light-blocking part 23*b* moves in a direction perpendicular to a plane of FIG. 3 to block the space between the light emitting device and the photo acceptance device of the front sensor 22. In a similar way, although the rear detection mechanism 12 is structured in such a way that; when the surface of the card 2 contacts the card-contacting part 25*a*, the light-blocking part 25*b* moves downward in FIG. 2 to block the space between the light emitting device and the photo acceptance device of the rear sensor 24 in the embodiment described above; the rear detection mechanism 12 may be structured in such a way that; when an end surface of the card 2 contacts the card-contacting part 25*a*, the light-blocking part 25*b* moves in a direction perpendicular to a plane of FIG. 2, or in a direction toward a rear side of FIG. 2 to block the space between the light emitting device and the photo acceptance device of the rear sensor 24.

Although the card reader 1 in the embodiment described above is a so-called dip-type card reader, a card reader to which the structure of at least an embodiment the present invention is applied may be a so-called swipe-type card reader. Furthermore, although the card reader 1 in the embodiment described above is a manual card reader, a card reader to which the structure of at least an embodiment the present invention is applied may be a card reader of a card transfer method, which includes a transfer roller for transferring the card 2, and a driving mechanism for driving the transfer roller.

In the embodiment described above, the card reader 1 is a card reader for handling a card; which deals with a card 2 made of vinyl chloride, a card 2 made of PET (polyethylene tere-phthalate), a card 2 made of paper, and the like. Also, in another way for example, a card reader to which the structure of at least an embodiment the present invention is applied may be a card reader for handling any kind of card medium other than a card 2, such as a passport and the like.

In the embodiment described above, the card reader 1 is used, while being installed in the predetermined higher-level device. Also, in another way for example, the card reader 1 may be a so-called stand-alone card reader (i.e., a card reader to be used without being installed in a higher-level device). In this case, if the control section 13 judges that the front detection mechanism 11 has an error, for example, the control section 13 controls the card reader 1 in such a way that an indication is displayed in a predetermined display unit which the card reader 1 is equipped with, and the like, for notifying the user that the card reader 1 cannot be used.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card medium processing device for use with a card medium, the card medium processing device comprising:
    a plurality of detection means for detecting insertion of the card medium, the plurality of detection means comprising a first detection means and a second detection means; and
    a control means, into which an output signal coming from the plurality of detection means is input, for judging whether the plurality of detection means has an error;
    wherein the second detection means is placed at a position behind the first detection means toward a rear side in an inserting direction of the card medium; and
    the control means is configured to judge that the first detection means has an error, if the first detection means does not detect the card medium having been inserted while the second detection means detects the card medium having been inserted.

2. The card medium processing device according to claim 1:
    wherein the control means is configured to judge that the first detection means has an error, if the first detection means does not detect the card medium having been inserted while the second detection means detects the card medium having been inserted 'n'-times, n being an integer equal to or greater than '2'.

3. The card medium processing device according to claim 2:
    wherein the control means is configured to judge that the first detection means has an error, if the first detection means does not detect the card medium having been inserted while the second detection means detects the card medium having been inserted 'n' continuous times.

4. The card medium processing device according to claim 1:
    wherein the card medium processing device is installed in a higher-level device having a higher-level control means; and wherein the control means is configured to send an error occurrence signal to the higher-level control means a time when judging that the first detection means has an error.

5. The card medium processing device according to claim 1, further comprising:
    a card inserting port for inserting the card medium, and
    a card passing path that is shaped to lead to the card inserting port, and for having the card medium pass through;
    wherein the first detection means is configured to detect the card medium having been inserted through the card inserting port; and
    the second detection means is configured to detect an end part of the card medium at a side toward the inserting direction having reached a rear end side of the card passing path in the inserting direction, and the card medium having stopped at a predetermined position.

6. The card medium processing device according to claim 1:
wherein the card medium processing device is a manual card-medium processing device for manually handling the card medium by a user of the card medium processing device.

7. The card medium processing device according to claim 1:
wherein the first detection means comprises:
a mechanical detection means including a contacting member that the card medium contacts, and
a sensor for detecting displacement of the contacting member.

8. A control method of a card medium processing device comprising:
judging whether or not a card medium having been inserted is detected by a first detection means for detecting the card medium having been inserted;
judging whether or not the card medium having been inserted is detected by a second detection means for detecting the card medium having been inserted, the second detection means being placed at a position behind the first detection means further away toward a rear side in an inserting direction for the card medium; and
carrying out a predetermined process when it is determined that the first detection means has an error the error being indicated when the first detection means does not detect the card medium having been inserted while the second detection means detects the card medium having been inserted.

9. The control method of a card medium processing device according to claim 8, further comprising:
judging whether or not the first detection means does not detect the card medium having been inserted while the second judgment step detects the card medium having been inserted "n" continuous times, where 'n' is an integer equal to or greater than '2'; and
wherein the error is indicated by the first detection means not detecting the card medium while the second detection means detects the card medium "n" continuous times.

10. A card medium processing device for use with a card medium, the card medium processing device comprising:
a front detection mechanism configured to detect insertion of the card medium;
a rear detection mechanism configured to detect insertion of the card medium;
a control section configured to receive an output signal from the front detection mechanism and the rear detection mechanism, and configured to judge whether the front detection mechanism or the rear detection mechanism has an error;
wherein the rear detection mechanism is provided at a position behind the front detection mechanism toward a rear side in an inserting direction of the card medium; and
the control section is configured to judge that the front detection mechanism has an error, if the front detection mechanism does not detect the card medium having been inserted while the rear detection mechanism detects the card medium having been inserted.

* * * * *